(12) United States Patent
Hjelmström et al.

(10) Patent No.: US 10,531,058 B2
(45) Date of Patent: Jan. 7, 2020

(54) METHOD FOR ENHANCING COLOR IMAGES, AND AN ASSEMBLY PERFORMING SUCH METHOD

(71) Applicant: Axis AB, Lund (SE)

(72) Inventors: Jonas Hjelmström, Lund (SE); Stefan Lundberg, Lund (SE); Ingemar Larsson, Lund (SE)

(73) Assignee: AXIS AB, Lund (SE)

( * ) Notice: Subject to any disclaimer, the term of this patent is extended or adjusted under 35 U.S.C. 154(b) by 16 days.

(21) Appl. No.: 16/009,247

(22) Filed: Jun. 15, 2018

(65) Prior Publication Data

US 2019/0007665 A1 Jan. 3, 2019

(30) Foreign Application Priority Data

Jun. 29, 2017 (EP) .................................. 17178716

(51) Int. Cl.
*H04N 9/64* (2006.01)
*H04N 5/238* (2006.01)
*H04N 5/33* (2006.01)
*H04N 5/225* (2006.01)
*H04N 5/235* (2006.01)
(Continued)

(52) U.S. Cl.
CPC ........... *H04N 9/646* (2013.01); *H04N 5/2254* (2013.01); *H04N 5/238* (2013.01); *H04N 5/33* (2013.01)

(58) Field of Classification Search
CPC .......... H04N 9/646; H04N 5/238; H04N 5/33; H04N 5/2254; H04N 5/2355; H04N 5/2356; H04N 9/73; H04N 5/2253; H04N 9/045

See application file for complete search history.

(56) References Cited

U.S. PATENT DOCUMENTS

2006/0261280 A1* 11/2006 Oon .................... H04N 5/2256
250/370.08
2010/0102366 A1 4/2010 Lee et al.
(Continued)

FOREIGN PATENT DOCUMENTS

CN 202159217 U 3/2012
EP 3 343 287 A1 7/2018
(Continued)

OTHER PUBLICATIONS

Extended European Search Report dated Dec. 7, 2017, in Patent Application No. 17178716.1, pp. 4.
(Continued)

*Primary Examiner* — Albert H Cutler
(74) *Attorney, Agent, or Firm* — Xsensus, LLP (57) ABSTRACT

A method and assembly produce color images of a scene captured by an image sensor exposed to visible light as well as IR radiation. A first image is captured with a first proportion of an iris aperture covered by an IR-cut filter. A first amount of radiation captured in the first image is determined and a second image captured with a second proportion of the iris covered by the IR-cut filter. A second amount of radiation captured in the second image is determined and a proportion of IR radiation is calculated in the scene based on the first amount of light, the second amount of light, the first IR-cut filter proportion, and the second IR-cut filter proportion. An IR contribution is removed from an image by using the calculated proportion of IR radiation.

16 Claims, 4 Drawing Sheets

(51) Int. Cl.
*H04N 9/73* (2006.01)
*H04N 9/04* (2006.01)

(56) References Cited

U.S. PATENT DOCUMENTS

| | | | |
|---|---|---|---|
| 2011/0019004 A1* | 1/2011 | Ohmori | H04N 9/045 |
| | | | 348/164 |
| 2011/0228145 A1 | 9/2011 | Kimura | |
| 2012/0026325 A1 | 2/2012 | Bunker et al. | |
| 2017/0150019 A1* | 5/2017 | Kyung | H04N 5/23212 |
| 2017/0264811 A1 | 9/2017 | Ollila et al. | |
| 2018/0041719 A1* | 2/2018 | Kurata | H04N 9/07 |
| 2018/0158208 A1 | 6/2018 | Higashitsutsumi | |
| 2018/0284576 A1* | 10/2018 | Nagano | H04N 5/238 |

FOREIGN PATENT DOCUMENTS

| | | |
|---|---|---|
| JP | H0386673 U | 9/1991 |
| JP | 2001036807 A | 2/2001 |
| JP | 2003-274229 A | 9/2003 |
| JP | 2003264842 A | 9/2003 |
| JP | 2004-361590 A | 12/2004 |
| JP | 2014-225828 A | 12/2004 |
| JP | 2006-78666 A | 3/2006 |
| JP | 2010-068020 A | 3/2010 |
| JP | 2013-152369 A | 8/2013 |
| JP | 2016-184082 A | 10/2016 |
| WO | 2011101036 A1 | 8/2011 |

OTHER PUBLICATIONS

Office Action issued in European Application 17 178 716.1-1208 dated Feb. 20, 2019.

Notice of Reasons for Rejection issued in Japanese Application dated Feb. 26, 2019.

U.S. Office Action dated Aug. 23, 2019 in U.S. Appl. No. 15/857,127.

* cited by examiner

METHOD FOR ENHANCING COLOR IMAGES, AND AN ASSEMBLY PERFORMING SUCH METHOD

TECHNICAL FIELD

The present invention relates to removal of a contribution of an infrared component from an image comprising a recorded signal emanating from both infrared radiation and visual light. The invention also relates to a device configured to perform such method.

TECHNICAL BACKGROUND

The use of IR (infra-red) filters for cameras is well known in the art, and in particular in relation to digital cameras. In short, the image sensor of the camera has a spectral response with a non-negligible component in the infrared. This results in opportunities as well as challenges. An opportunity lies in that in low-light conditions the IR-component may provide useful information about the imaged scene, information which may be enhanced even further by means of an IR light source. A challenge is found during day-time imaging, where the addition of an IR-component will distort the color balance in the image, and it may also saturate the image sensor completely.

A way of maintaining the beneficial effects while suppressing the less beneficial effects is to add a movable IR-cut filter in the beam path in front of the image sensor. In this way, the IR (cut) filter may be used during daylight conditions, enabling acquisition of color images. Through-out the application "IR-cut filter" and "IR-filter" may be used interchangeably, and unless explicitly stated "IR-filter" will in the present context correspond to an IR-cut filter. Pixels of the image sensor will then operate in a first manner, where the incident light is divided into colors and detected as a charge on individual photodetectors thus enabling color separation. During night time, or in low-light conditions the IR filter may be removed and use is made of the resulting increase in incoming radiation from the IR portion of the spectrum. The IR radiation will not contain any color information, and instead of performing a color separation, the only parameter is the intensity of the incoming radiation, which may be presented as a black and white intensity image (or with any desirable color scale). The addition of an IR light source may enhance the image even further.

There may, however, be instances where it would be desirable to remove the IR contribution from such images with the purpose of generating true color images. The present invention will offer a method for performing such removal and a device configured to perform such a method.

SUMMARY

In an effort to improve imaging when a scene comprises both IR radiation and visual light the present invention provides a method of producing color images of a scene captured by an image sensor exposed to visible light as well as IR radiation. The method comprises capturing a first image with a first proportion of an aperture covered by an IR-cut filter, determining a first amount of radiation captured in the first image, capturing a second image with a second proportion of the aperture covered by the IR-cut filter, determining a second amount of radiation captured in the second image. Following these measurements, a proportion of IR radiation in the scene is calculated based on the first amount of captured radiation, the second amount of captured radiation, the first IR-cut filter proportion, and the second IR-cut filter proportion. Following this calculation, an IR contribution may be removed from an image by using the calculated proportion of IR radiation. In this way, a true color representation may be obtained, even though the imaged scene will contain IR-radiation captured by the image sensor.

In one or more embodiments, the calculation is based on single-image measurements, while for other embodiments a mean value for several image frames is calculated in order to improve statistics.

In one or several embodiments a change from the first IR-cut filter proportion to the second IR-cut filter proportion is effected by changing a size of the aperture, which is a straightforward and simple manner to alter the proportions. The change, and thus the measurement, may be performed rapidly and with little or no visual effect on the showed or recorded video, at least for some use cases. In other embodiments, it may be preferred to hide image frames affected during the measurement. As a further advantage, embodiments where the aperture size is changed would not require additional movable mechanics to be added to a camera performing the method.

In still other embodiments the change from the first IR-cut filter proportion to the second IR-cut filter proportion is effected by inserting or removing an IR-cut filter in a portion of the aperture. By varying the portion covered by an IR-filter it is possible to swiftly obtain the measurement data required to conclude the method according to several embodiments thereof.

In still other embodiments the IR-cut filter may be a liquid crystal filter (LC-filter) and the change from the first IR-cut filter proportion to the second IR-cut filter proportion may be effected by switching the LC-filter from a first state to a second state. Using an LC-filter introduces a highly controllable function without introduction of any moving parts. The use of an LC-filter will be more thoroughly discussed in the detailed description, as will other embodiments.

In one or any embodiment the IR contribution is removed from the first image, the second image or a third acquired image by using the calculated proportion of IR radiation. Basically, the removal of the IR contribution should be performed in order to obtain true color information. This will be trivial when using the first or second image, since these are the images used when calculating the contribution. However, unless the IR-contribution is changing rapidly it could equally well be removed from a third image, even though calculations are performed on the first and second image. Also, the first and second image may correspond to first and second sets of images, if a mean value is used in the calculation. Importantly, the processing required does not prevent the calculation from being performed for each image pair, yet in most applications this is not needed and therefore it can be avoided. In some embodiments, the same IR-contribution may be removed from several successive images, unless a change is detected in the imaged scene.

In any embodiment, calculation of the IR proportion in the image may be performed on the level of individual pixels or individual groups of pixels of the image. In this way, one or more sources of IR-contribution may be located and measures may be taken to improve the imaging based on this knowledge. In one or more embodiments, localized IR-sources may result in that the compensation (the removal of IR-contribution) is isolated to the relevant areas, whereas areas having small or even miniscule IR-contribution are left unaffected. This saves processing power, and in embodiments where application of the method raises a level of noise, such unnecessary raise is avoided. The knowledge may also be used to determine that it is appropriate to use multiple exposures, whereof at least one having a longer exposure time and at least one having a shorter exposure time so as to enable retrieval of color information even if there is a strong source of IR, and to avoid saturation of pixels in the location of such strong source or IR.

There are practical benefits in having the IR-cut filter of any embodiment arranged in the aperture stop, in the immediate vicinity of the iris aperture. "In the aperture stop" will in practice read "as close to the aperture stop as physically possible". If there is an iris aperture located in the aperture stop, and the IR-cut filter is not a direct part of the iris aperture a position immediately adjacent to the iris aperture stop would be the best possible solution available.

According to another inventive concept, the present invention relates to an assembly comprising a camera, a camera controller, a camera lens and an aperture arrangement for controlling the amount of radiation reaching an image sensor of the camera, wherein an IR cut filter is integrated in the aperture arrangement. The assembly is configured to perform the method according to the description given above or below. Notably, the inventive assembly would not have to perform all methods in a single embodiment, it would be represented by at least as many embodiments as there are embodiments in relation to the inventive method.

As an example of this, in one or more embodiments the aperture of the assembly may comprise at least two diaphragm blades, and the IR cut filter may arranged on at least one of the diaphragm blades.

In at least one embodiment the IR cut filter may be arranged adjacent to the aperture and have IR-cut properties in a central portion thereof, while not radially outside of the central portion. This embodiment enables for the inventive method to be performed without addition of any additional movable elements.

A direct opposite of the previous embodiment may also be realized by an assembly in which the IR cut filter has IR-cut properties varying over a surface thereof and is movably arranged adjacent to the diaphragm. Moving the IR-cut filter will effectively accomplish the sought-for effect.

In one or more other embodiments, the IR-cut filter may be an LC-filter having a first state and a second state, or wherein the IR-cut filter is rotatably arranged. Of these two branches of embodiments the LC-filter will give the advantages already disclosed, while the rotatably arranged filter may result in other advantages.

In one or any embodiment the IR-cut filter may be arranged in or in the immediate vicinity of the aperture stop, as discussed in relation to embodiments of the inventive method.

According to a third aspect of the present invention it relates to a computer readable medium containing program instructions for causing a camera processor to perform the method of any embodiment.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

DETAILED DESCRIPTION OF EMBODIMENTS

Figure 1:
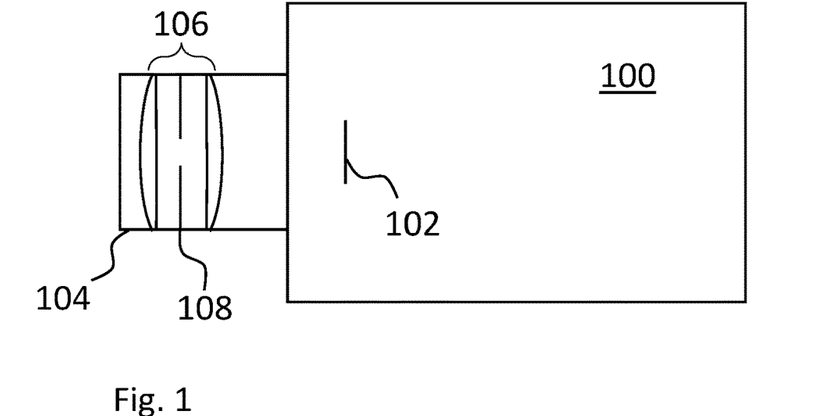
FIG. 1 is a schematic view of a camera setup.

FIG. 1 is a schematic view illustrating a setup in which the present arrangement and method may form a part. What is illustrated is a camera 100, such as a video camera, having an image sensor 102 and a camera lens housing 104. The camera lens housing 104 of the illustrated example has a standard layout with a lens system 106 and a diaphragm 108, e.g., an iris aperture. This is obviously a very simplistic description of a camera lens housing, but considered sufficient for the purposes of the present application.

The diaphragm 108 is placed in the aperture stop of the lens system 106 (or as close to the aperture plane as physically possible). For an ideal single-lens system the aperture stop would be positioned in the middle of the lens, orthogonally to the optical axis. Further to what has already been said, the features of the aperture stop imply that the size of the diaphragm will only affect the amount of light reaching the image sensor 102, not the actual image. More specifically it will not generate any shadowing or similar effects or artifacts in the image plane, i.e., in the plane of the image sensor. For this reason, it is standard practice to position the diaphragm (the aperture) in the aperture stop. Within the context of the present description "the aperture" may, but does not have to, correspond to the diaphragm, e.g. an iris aperture arranged in or near the aperture stop. In any case, use of the inventive method or device will alter the spectral composition of the radiation passing through the diaphragm.

By controlling the size of the opening of the aperture it is possible to control the amount of radiation reaching the sensor, which of course is well known from regular iris diaphragms used in cameras.

Figure 2:
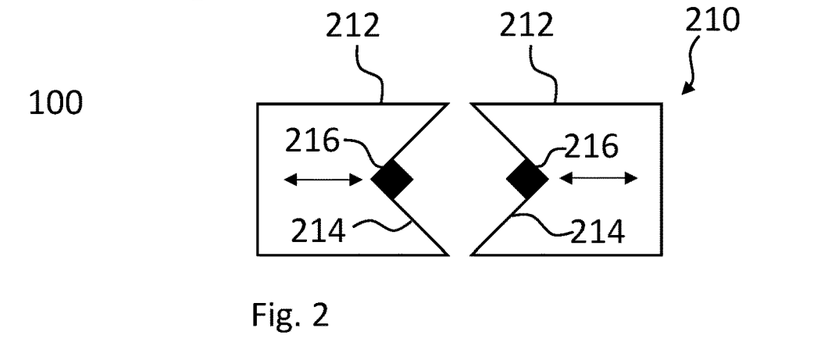
FIG. 2 is a schematic view of a diaphragm which may be used in embodiments of the present invention.

An iris aperture 210 which may be used in a first embodiment is illustrated in FIG. 2, and while the actual design may differ significantly, FIG. 2 is believed to describe the function to a satisfactory extent. The iris aperture 210 comprises two diaphragm blades 212, each having a triangular cutout 214. The arrows on each blade illustrate how they can move back and forth, preferably in a synchronized manner, which will lead to a variation in the size of the iris aperture defined by the triangular cutouts in combination.

Closing in on the present invention according to a first embodiment thereof, IR-filters 216 are arranged in the apex of each triangular cut-out. In the illustrated embodiment, the filters have been given a square shape, but the shape may differ. Furthermore, the shape of the cutouts 214 may differ. To some extent the shape of the cutout may be very freely designed, and different manufacturers provide different shapes. A common feature may be that as the iris aperture blades close, the formation of a slit-shaped aperture should be avoided, since this could result in unwanted effects. The shape of the filter or filters would obviously be adapted to the shape of the corresponding cutout. Returning to the IR-filters they are IR-cut filters, allowing transmission of visible light while preventing transmission of infrared radiation. It is apparent that when the iris aperture is open to the extent illustrated in FIG. 2, both visual light and IR-radiation will pass through the opening. Furthermore, it is readily appreciated that as the size of the iris aperture is decreased, a point will be reached where the aperture is fully covered by IR-filters, thus allowing transmission of visual light only. Ranging from this point and downwards (i.e. towards smaller apertures) the IR-filters will cover the aperture completely and the range is thus suitable for conditions where there is an abundance of ambient light, e.g., during daytime.

Consider that the full area defined by the combination of the cutouts will allow for transmission of visual light, while transmission of IR-radiation will be defined by the full area minus the area occupied by filters. Consequently, an effective aperture size will vary for the two wavelength regions. More specifically the area occupied by the IR cut filters is constant (disregarding any overlap in the illustrated embodiment), meaning that the ratio between visual light and IR-radiation will vary with the position of the blades of the iris aperture, i.e. the size of the iris aperture. Both the transmitted visual light and the IR-radiation will vary proportionally to the size of the aperture, but at different rates since they will have different effective apertures, and consequently the ratio between IR-radiation and visual radiation will vary.

Figure 9:
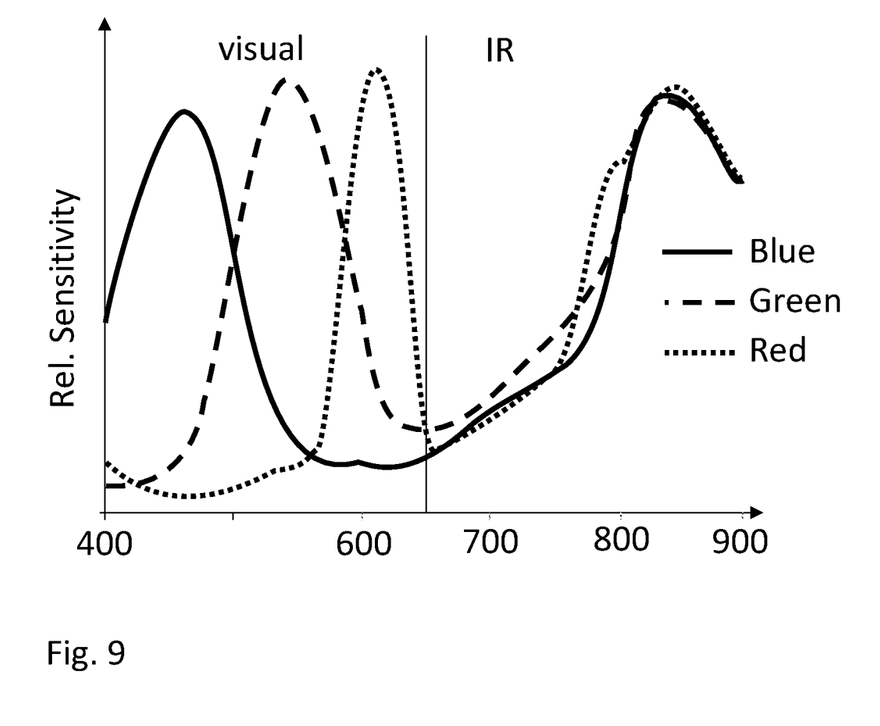
FIG. 9 is a graph illustrating, schematically, the spectral response of color pixels of an image sensor.

If the transmitted radiation were fully spectrally resolved it would be readily possible to monitor and evaluate the proportions, but it should be noted that generally the image sensor and associated components will at the most sort the incoming radiation into red, green and blue components, each of the color components including an IR component (which is indicated in FIG. 9), so as to be able to regenerate a color image, and it is generally not possible to isolate the infrared component at all. Image sensors enabling such spectral resolution have been disclosed in patent literature and includes NIR pixels, yet the cost for such image sensors is significantly more expensive at the present time. Further, the NIR pixels are included in the sensors at the expense of loss in resolution, most often in the green color component.

While the IR-cut filter is arranged in the aperture plane, other filters may be positioned in front of the sensor or even in front of the lens, one reason being that certain filters are changed depending on ambient light conditions and effects (such filters are typically arranged in front of the lens, or attached thereto), or that the filter is not considered to be removed or exchanged, or that control is performed by a separate actuator (in the case of filters arranged immediately in front of the image sensor).

Returning to FIG. 2 it should be apparent how the iris aperture 210 of the present embodiment may shift between a pure day-mode, where IR-radiation is fully blocked, and a night-mode, where transmission of IR-radiation to the image sensor is allowed. It should also be straightforward to realize how the size of the aperture may be varied, both within the day-mode and the night-mode in order to deduce, e.g., the amount of IR-light present in the scene.

In the traditional solution, a movable IR-cut filter is arranged in front of the image sensor in the day-mode and removed from the beam path in the night-mode. Therefore, in the traditional solution, the diaphragm aperture may be varied over an equal range in both the day-mode and the night-mode, since its function is isolated from the function of the filter, although in a practical situation the diaphragm is fully opened in night-mode. In contrast, for the present embodiments, the size of the filters 216 will affect how much the diaphragm may be opened before IR-radiation will start to be transmitted through the diaphragm aperture. For that reason, embodiments of the present invention may have to switch to night-mode, i.e. producing black and white images, earlier than what would have been the case in a traditional solution.

The reason is that introduction of IR-radiation to the image sensor will distort the color correction performed by the camera controller, since IR-radiation will affect all pixels (referring to FIG. 9), and an IR-filter is necessary to be able to provide a true color representation. Therefore, night-mode is generally presented in black and white only (only displaying intensity information rather than spectral information). For the present invention, according to some embodiments thereof, a range of intermediate states may exist between day-mode and night-mode. In these intermediate states the color correction algorithm is maintained, even though the displayed colors may be skewed. A user may choose the amount of distortions that may be considered acceptable and when a switch to true day-mode or true night-mode should be performed. Information of color differences may be valuable for a user, depending on the surveillance situation, even if the colors are skewed. Within the specification of the present application it will be disclosed how one may extract an IR-contribution to image intensity, such that adequate compensation may be performed. In this way, true color images may be accomplished, even if the radiation reaching the image sensor comprises both visual light and infrared radiation.

Figure 3:
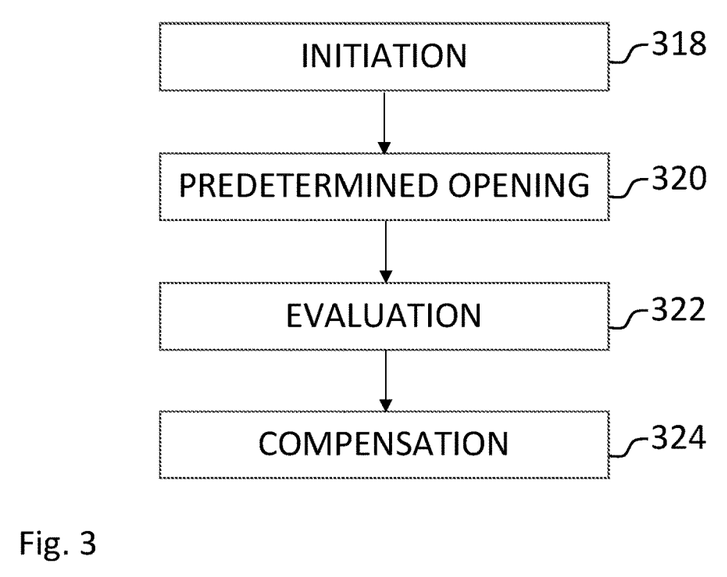
FIG. 3 is a flowchart outlining the main steps of the present invention, according to one or more embodiments thereof.
Figure 4A:
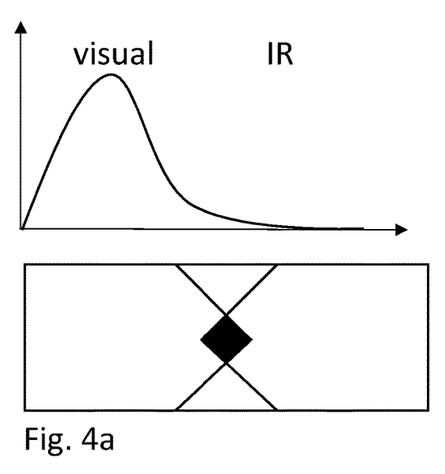
FIGS. 4a,b and 5a,b are combination views illustrating actual steps in the method of FIG. 3.
Figure 4B:
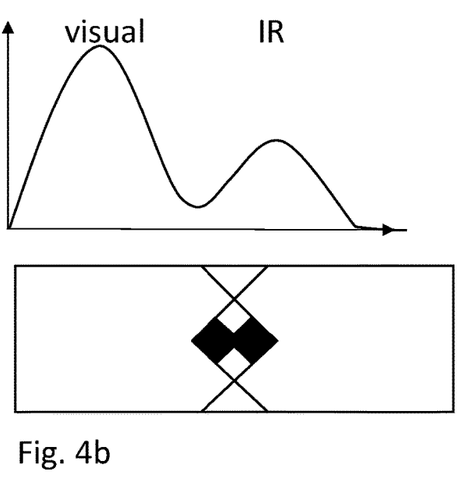
Figure 5A:
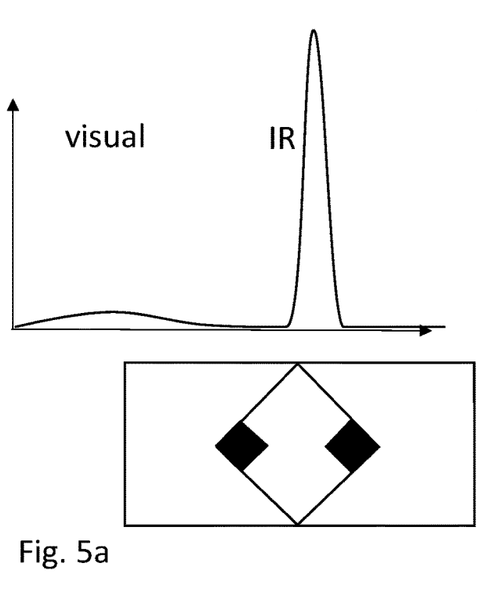
Figure 5B:
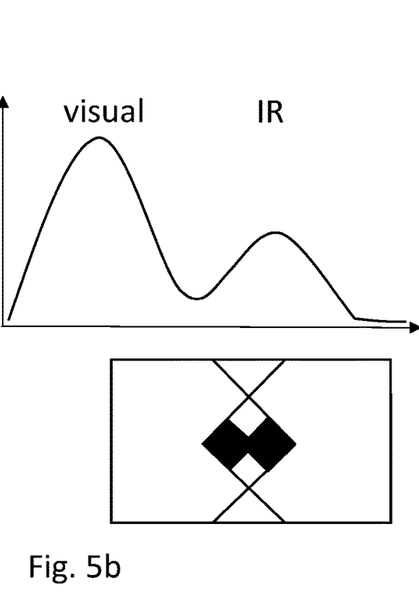

So far, we have only described a set-up enabling the present invention. In the following paragraphs, a method according to a first embodiment will be disclosed, referring to FIGS. 3, 4, and 5. FIG. 3 is a flowchart of the method, and FIGS. 4 and 5 are views illustrating two diaphragm settings and the associated transmitted radiation as a function of wavelength. The graphs are qualitative rather than quantitative.

FIG. 4 illustrates a portion of a method when starting from a pure day-mode, where only visual wavelengths are allowed to pass the iris aperture in its first setting, while FIG. 5 illustrates a portion of a method starting from a night-mode, where a mix of visual and IR wavelengths are allowed to pass in the starting position.

In a first step 318 the method is initiated. The initiation may be conducted automatically or based on a user-request.

A likely situation is that a user has selected a certain display mode, and that the method is performed within the framework of that display mode.

In a second step 320, the iris aperture, which also could be a separate aperture, is opened by a predetermined amount (lower portion of FIG. 4b) resulting in that the transmitted radiation starts to include wavelengths in the infrared wavelength region, as indicated in the graph of FIG. 4b. In the first image (or images taken when the iris aperture is in its first position as illustrated in FIG. 4a) there is no IR contribution at all.

In a third step 322 the effects of the predetermined opening are evaluated. By evaluating the effects of the predetermined opening, it will be possible to deduce the contribution of visual light and IR radiation, respectively. For this and any embodiment the evaluation may be performed on any level of resolution for the image, ranging from individual pixels or groups of pixels to larger portions of the image frame or the entire image frame. Also, the evaluation may be based on single frames, but for better statistics a number of image frames may be combined for each setting to form a mean value before the evaluation is performed. This is true for the present embodiment but also for all other embodiments of the present invention as disclosed herein and as defined in the appended claims.

Following the evaluation, it will be possible to isolate the contributions from visual and infrared wavelengths, and to compensate a resulting image accordingly, which is made in a fifth step.

Note yet again that the spectrally resolved information is not available, the image sensor may only detect an intensity. The intensity may be spatially resolved however, although a mean value or total value over the entire image sensor may give more reliable statistics, and finding minimal and maximal intensity may also provide critical information. By knowing the properties of the diaphragm, it is known however, how much the area transmitting visual light has increased, and how much the area transmitting IR-radiation has increased (basically from 0 to something else in the example of FIG. 4).

Turning to FIG. 5 there is a difference in that the initial image contains an IR-contribution. In the first position the diaphragm is almost fully opened, allowing transmission of IR and visual light. Apart from that, application of the present invention for the situation of FIG. 5 will be analogous to the application described referring to FIG. 4.

Following the initiation, the iris aperture may in the second step be closed to a first predetermined state, shown in the lower portion of FIG. 5b (it could of course equally well be opened to a predetermined state). At this point the amount of transmitted IR-radiation will have been reduced to a higher extent than the amount of visual light, which is illustrated in the shift of ratio obvious in the graph of FIG. 5b. Knowing how much the IR-transmitting diaphragm area and the visual-transmitting diaphragm area has changed makes it possible to deduce the contribution from the two wavelength regions; visual and infrared, respectively. Subsequently a compensation or correction may be effected.

Figure 6A:
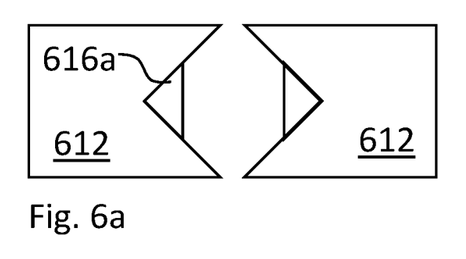
FIGS. 6a and 6b are views of diaphragm/filter combinations which may be utilized for the purposes of enabling the present invention.
Figure 6B:
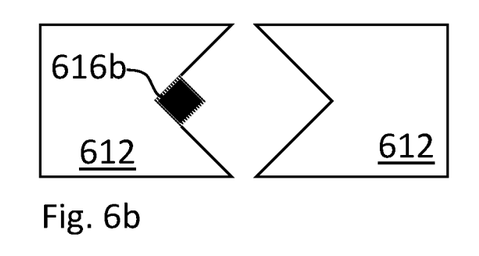

FIGS. 6a and 6b are views of some alternative embodiments for the iris and filters. In FIG. 6a a filter 616a having triangular cross section is arranged on each blade, enabling a complete IR-block without overlapping filters, and in FIG. 6b there is a single filter 616b arranged on one of the blades enabling IR-block and varying aperture size without any filter overlap.

Figure 7A:
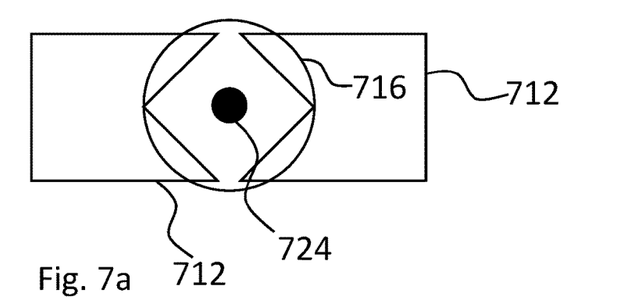
FIGS. 7a, 7b, and 7c are views of further combinations of diaphragm/filter combinations which may be utilized for the purposes of enabling the present invention according to further embodiments thereof.
Figure 7B:
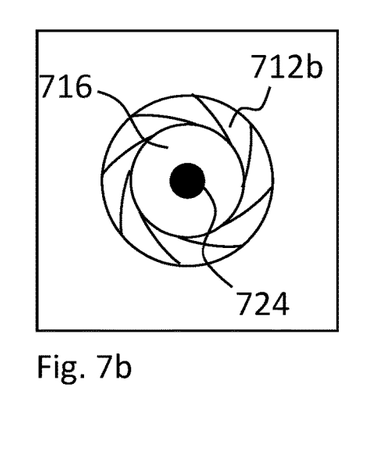
Figure 7C:
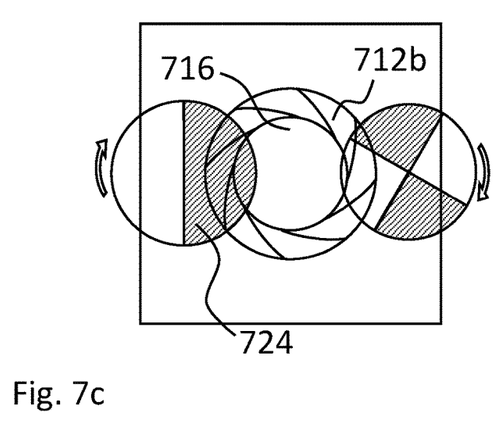

FIG. 7a illustrates an alternative to including the IR-cut filter in the iris blades, namely to have an IR-cut filter 716 with varying spectral transmittance over its surface. In the illustrated example the IR-cut filter is only a true IR-cut filter in a central portion 724 thereof, while the rest of the filter 716 transmits both visual light and IR-radiation. Arranging such an IR-cut filter fixedly in or near the plane of the diaphragm enables use of a method according to the already disclosed embodiments. Embodiments where the IR-cut filter is included in a diaphragm arrangement rather than in a diaphragm blade enable use of more elaborate diaphragm constructions. An example is a combination with an iris diaphragm 712b, as shown in FIG. 7b. FIG. 7c illustrates a further embodiment, or actually two, of the filter arrangement. The common denominator is that the IR-cut 724 filter is arranged such that it may be rotated. Also, the component including the IR-cut filter also includes an area without filter, i.e. an area that transmits both IR-radiation and visual light. Furthermore, a portion of the component will extend into the iris aperture, and by rotation of the component it will be possible to vary the area of the iris aperture being covered by an IR-cut filter. In the arrangement to the left the component comprises two areas, of which the hatched area corresponds to the IR-cut filter, and the non-filled area corresponds to the filter-less area. In the arrangement to the right there are instead four areas. Note that only one of the components would be used in a single embodiment, and that the shape and design of the filters may vary greatly while still enabling application of the present invention as defined by the claims. Rotation may be effected with an electric actuator. Apart from the different design, the embodiments of FIG. 7c will enable realization of the present invention according to one or any embodiment thereof. A further elaboration of the embodiments in this branch would be to arrange the rotatable filter eccentrically (or have an eccentrically shaped filter) such that an area covered by the filter could be varied by controlling the filter as well as by controlling the size of the aperture.

Figure 8:
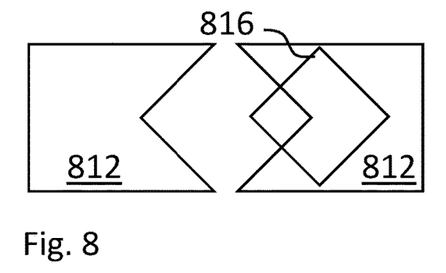
FIG. 8 is a view of another diaphragm/filter combination which may enable the present invention according to further embodiments.

FIG. 8 illustrates a further embodiment of the present invention. In this embodiment, the IR-cut filter is embodied in a liquid crystal filter (LC-filter) 816. The LC-filter is configured to switch between a state in which it transmits visual light and blocks IR-radiation, and a state in which it blocks both visual light and IR-radiation. The LC-filter is superposed on an IR-filter. Thus, when the LC-filter is in the first state, visual light may pass through the combined filter, but IR-radiation is blocked, and in the second state, both visual light and IR-radiation are blocked. By use of this arrangement it will be possible to perform the inventive method in a very convenient manner and without any additional mechanical parts. The LC-filter may be arranged on the diaphragm blades 812, but it may also be statically arranged in the vicinity of or in the aperture stop. The latter, statically arranged in the vicinity of, or in, the position of the aperture stop, would be the preferred alternative for most embodiments, since it would minimize the number of moving components. In other embodiments, the LC-filter may be arranged to transmit all wavelengths (at least visual and NIR, wavelengths for which the image sensor has a non-negligent response) in a first state, and transmit only visual in a second state. In such embodiments, there is no need to superpose the LC-filter on an IR-filter.

Although the LC-filter may shift between states very rapidly, each transition will have a slope at some time scale. For instance, it may shift to a state in which it blocks all radiation almost instantly, while the transition back to a partly transmitting state is slower. If the image sensor used operates with a rolling shutter, individual rows will be affected differently resulting in artifacts in the image. The behavior is however predictable, and compensating for the artifacts may be performed in a straightforward manner, meaning that a continuous stream of images may be provided while the method is performed. Correcting for such artifacts may be more difficult in the embodiment where a rotating filter is used, and therefore it may be preferable to prevent the image frames acquired during the measurement from being shown. An alternative would be to use a global shutter, presently less often used in digital video, yet increasingly common.

In an example where the LC-filter covers a portion Av of the full area A of the aperture, and the LC-filter is superposed on an IR-filter, an example of the disclosed embodiment could be used to calculate an IR-contribution in the following manner:

$$\frac{I_v}{I_v + I_n} = \frac{A - A_v}{A_v} * \frac{P_1 - P_2}{P_2}$$

$I_v$: Intensity in the visual range
$I_n$: Intensity in the near infrared range
$A_v$: Area covered by IR-cut filter
A: Full area
$P_1$: Readout from pixel when LC-filter transmits
$P_2$: Readout from pixel when LC-filter blocks The actual equation and the parameters used as input may of course be different depending on the setup, yet note that all parameters on the right side of the equation are known following the measurement or from a look-up table for the particular setup. Note also that the equation is applicable on every portion of the image, ranging from single pixels or groups of pixels to the entire image, provided that the filter is arranged in or near the aperture stop.

An effect of this embodiment is that in one of the states, an IR-cut filter will be arranged over a portion of the iris aperture, while in the other state that portion of the iris aperture will block IR-radiation as well as visual light. However, for each state, the dimensions of the iris being covered and not covered will be known, resulting in that the calculation is as straightforward as in the previously disclosed embodiments.

In the embodiment of FIG. 8 the arrangement of the LC-filter mimics the arrangement of FIG. 2 and similar embodiments, yet it may also be arranged in a way corresponding to the embodiment of FIGS. 7a and 7b and similar embodiments, meaning that the active area of the IR-cut filter could correspond to a (smaller) portion of the full filter, that the filter could be statically arranged, or a combination thereof. As mentioned above, a tunable bandpass LC-filter may be used, which in one state transmits visual and light and IR-radiation, and in another state transmits visual light, but blocks IR-radiation. With such a filter, it is conceivable to cover the entire iris aperture with the filter and to effect changes in the proportion of IR-radiation allowed to pass through the aperture by tuning the LC-filter. However, a drawback of such an approach would be that some light intensity would at all times be lost, since the LC-filter is not completely "open" even in the state in which it allows transmission of both visual light and IR-radiation.

Throughout the drawings, like components have been given like reference numerals, only differing in an identifier relating to the number of the drawing. The similarity between drawings will enable a reader to readily understand the different drawings, thus making an excessive use of reference numerals superfluous.

A common feature regarding the behavior of the aperture arrangement in the disclosed embodiments is that the ratio between IR-radiation and visual light transmitted through the arrangement will vary over the range of aperture openings possible. The smaller the opening, the smaller the ratio (i.e. the visual portion will increase) to a point where essentially no IR-radiation is transmitted (the attenuation will be limited by the properties of the IR-cut filter) and the ratio basically is zero. The ratio will increase with the size of the aperture opening, but it will never reach 1, since there will always be a portion of the aperture opening being covered by the IR-cut filter. Also, the aperture opening will have a region where there is essentially no IR-light, and therefore there will be an interval close to a fully closed position where the ratio is constant. The size of this interval will be affected by the size of the IR-cut filter.

The inventive method may be effected by merely using a sum of the signal from the entire image sensor. Forming the ratio between the original image and the image in which another proportion of the aperture is covered with the IR-cut filter enables the formation of a system of equations. The solution of the system of equations is straightforward and it reveals the parameters that in turn enable prediction of the contribution of different wavelength regions to an image acquired by an image sensor.

The invention claimed is:

1. A method of producing color images of a scene captured by an image sensor exposed to visible light as well as IR radiation, the method comprising:
   capturing a first image with a first proportion of an aperture covered by an IR-cut filter,
   determining a first amount of radiation captured in the first image,
   capturing a second image with a second proportion of the aperture covered by the IR-cut filter,
   determining a second amount of radiation captured in the second image,
   calculating a proportion of IR radiation in the scene based on the first amount of captured radiation, the second amount of captured radiation, the first IR-cut filter proportion, and the second IR-cut filter proportion and
   removing an IR contribution from an image by using the calculated proportion of IR radiation.

2. The method of claim 1, wherein a change from the first IR-cut filter proportion to the second IR-cut filter proportion is effected by changing a size of the aperture.

3. The method of claim 1, wherein a change from the first IR-cut filter proportion to the second IR-cut filter proportion is effected by inserting or removing an IR-cut filter in a portion of the aperture.

4. The method of claim 1, wherein the IR-cut filter is a liquid crystal filter, and wherein a change from the first IR-cut filter proportion to the second IR-cut filter proportion is effected by switching the LC-filter from a first state to a second state.

5. The method of claim 1, wherein the IR contribution is removed from the first image, the second image or a third acquired image by using the calculated proportion of IR radiation.

6. The method of claim 1, wherein the calculating the IR proportion in the image is performed on a level of individual pixels or individual groups of pixels of the image.

7. The method of claim 6, further comprising localizing areas of the image having an elevated amount of IR radiation, by comparing an IR-proportion over the image.

8. The method of claim 1, wherein at least one of said first image and said second image is a result of a multiple exposures, wherein the multiple exposures having at least one exposure having a longer exposure time and at least one exposure having a shorter exposure time.

9. The method of claim 1, wherein the IR-cut filter is arranged in an aperture stop, in an immediate vicinity of an iris aperture.

10. An assembly comprising:
a camera having an image sensor;
a camera controller,
a camera lens; and
an aperture arrangement configured to control an amount of radiation reaching the image sensor of the camera, wherein the aperture arrangement including an aperture and an IR cut filter, wherein the camera controller is configured to control
   capture of a first image with a first proportion of the aperture covered by the IR-cut filter,
   determine a first amount of radiation captured in the first image,
   capture of a second image with a second proportion of the aperture covered by the IR-cut filter,
   determine a second amount of radiation captured in the second image,
   calculate a proportion of IR radiation in the scene based on the first amount of captured radiation, the second amount of captured radiation, the first IR-cut filter proportion, and the second IR-cut filter proportion, and
   remove an IR contribution from an image by using the calculated proportion of IR radiation.

11. The assembly of claim 10, wherein the aperture comprises at least two diaphragm blades, and wherein the IR-cut filter is arranged on at least one of the at least two diaphragm blades.

12. The assembly of claim 10, wherein the IR-cut filter is arranged adjacent to the aperture and has IR-cut properties in a central portion thereof, while not radially outside of the central portion.

13. The assembly of claim 10, wherein the IR-cut filter has IR-cut properties varying over a surface thereof and is movably arranged adjacent to the aperture.

14. The assembly of claim 10, wherein the IR-cut filter is an LC-filter having a first state and a second state.

15. The assembly of claim 10, wherein the IR-cut filter is rotatably arranged.

16. The assembly of claim 10, wherein the IR-cut filter is arranged in or in an immediate vicinity of an aperture stop of the aperture.

* * * * *